March 30, 1954 M. V. KALFAIAN 2,673,893

PHONETIC PRINTER OF SPOKEN WORDS

Filed Feb. 24, 1953 6 Sheets-Sheet 1

INVENTOR.

Myron V. Kalfaian

INVENTOR.

Myron V. Kalfaian

INVENTOR.
Meguer V. Kalfaian

PHONETIC PRINTER OF SPOKEN WORDS

Filed Feb. 24, 1953 6 Sheets-Sheet 4

INVENTOR.

Mygar V. Kalfaian

INVENTOR.

Myer V. Kalfaian

March 30, 1954 M. V. KALFAIAN 2,673,893

PHONETIC PRINTER OF SPOKEN WORDS

Filed Feb. 24, 1953 6 Sheets-Sheet 6

INVENTOR.

Myron V. Kalfaian

Patented Mar. 30, 1954 2,673,893

UNITED STATES PATENT OFFICE 2,673,893

PHONETIC PRINTER OF SPOKEN WORDS

Meguer V. Kalfaian, Los Angeles, Calif.

Application February 24, 1953, Serial No. 338,256

8 Claims. (Cl. 178—31)

Figure 1:
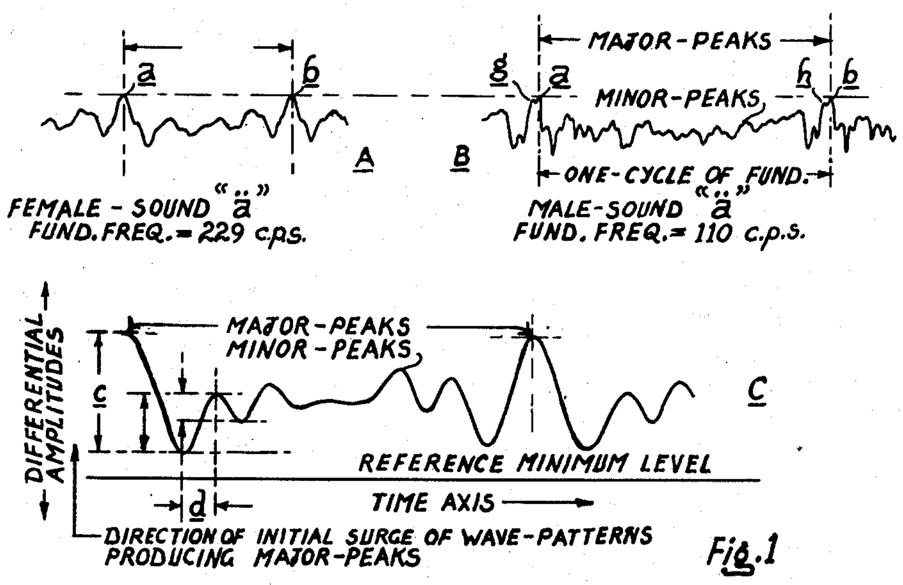

This invention relates to the analysis of speech waves, and more particularly to those waves that are repsonsible for the intelligibility of phonetic characters in spoken sounds. Its main object is to provide methods and means for the analysis of various wave patterns during propagation of articulate sounds for the selection and control of phonetic characters contained therein. A corollary object is to provide methods and means to translate the selected phonated characters into discrete signals for the actuation of character-printing keys, for example the keys of a modified electric typewriter, or slotted code bars such as in teletypewriter devices, so that spoken words may be translated into visual words.

In ordinary speech, the intelligibility of each phonetic sound is characterized by the specific shape of wave patterns that repeat successively, at a fundamental (pitch) frequency, during propagation of the articulated sound. The succession of these wave patterns is effected by fairly regular puffs of air from the glottis, which are set into vibration in the momentarily formed resonant cavities of the vocal system. These puffs of air are necessary to initiate the various vibrations, as the human muscles resolve into relaxation cycles, and cannot sustain vibration under continuous flow of air. In some cases, for example, the hissing sound "*s*," the tongue may be the controlling element of these puffs of air. Under any condition however, the shape of each wave pattern is determined by the number of frequency components that are produced in these cavities, and their relations with regard to frequency positions and amplitude levels one with another. Thus, each wave pattern (by way of the relative peak positions and movements, which are generally called formants) contain all the information that is necessary to convey intelligence; although several of them are necessary to allow time for the slow response of human intelligence to interpret them.

The waveform conditions as stated above, for each phonetic sound, do not always take the ideal shape for simple analysis, as the larynx introduces complex frequency components that are not associated with the intelligibility of the phonated sound; other than determining the esthetic quality of the voice. Moreover, the total number of harmonic compouents are increased with the lowering of the voice pitch, the condition of which complicates the decision of selecting the basic frequency components that compose the phonetic sound. But the most serious is the inconsistency of the speaker's pitch, which varies from one instant to another; even with an effort of speaking in monotone. In general, the pitch of male and female voices vary widely; about 90 to 300 cycles per second. Thus, by changing the time period of any wave pattern, the frequency positions of the information-bearing peaks are shifted widely in the voice spectrum. But the intelligibility of each phonetic sound is determined by the ratios of basic frequency components, and their relative amplitudes, with respect to the fundamental frequency, regardless of the locations of all the frequencies in the voice spectrum. Accordingly, the human intelligence interprets phonetic sounds by measuring the ratios of basic frequency components, and their relative amplitudes, with respect to the fundamental, without regard to the other complex components that are produced by the larynx. In practical wave-analysis however, the variables must be first shifted to a standard value.

In order to eliminate the variables of pitch, for any voice, it is possible to measure the differences of the fundamentals with respect to a reference frequency, and shift all frequency components of the speech linearly to frequency regions where they will all be based on a single reference (fundamental) frequency. Sets of basic frequency components which collectively define phonetic sounds may then be selected from the transposed waves, for final .analysis and translation into visible intelligible indicia. Such frequency transposition will standardize the relative positions of the formants in the entire spectrum band of the voice frequencies. As indicated in the foregoing however, ordinary speech contains complex waves, and in many cases, the formants of a low pitched voice, either repeat, or are in the same frequency positions in the voice spectrum band, as in equivalent sounds of high pitched voices. As an illustration, the first graph of the sound "*ä*" in Fig. 1 is produced by a female voice having fundamental of 229 cycles per second, and the second sound is produced by a male voice having fundamental of 110 cycles per second; the distance between *a* and *b* in each case being one cycle period of the fundamental. Inspection of these graphs shows that the low pitched voice may contain high frequency components equivalent to those in the high pitched voice. These high frequency components however are mostly due to the action of the larynx, and partly due to strong harmonics of the original formants in the low pitched voice; the superficial frequency components being usually outside of the spectrum band of the basic components that compose the pure phonetic sounds. Such conditions exist randomly and cannot be examined readily by frequency tests, because of the unpredictable variables that are carried by the speaker's voice from instant to instant during propagation of the phonetic sound. The true condition may be recognized by the fact that, the waveform of the low pitched voice (shown in Fig. 1) can be transformed substantially equivalent to the waveform of the high pitched voice, by first recording it; second, reproducing it in the same time-length as of the high pitched wave, and third, by cancelling out (through filter circuits) the very high frequency components that spread beyond the spectrum band embraced by the high pitched wave. There will still remain some intermediate frequency components that represent harmonics of the low-pitched fundamental, but for practical purposes the frequency-transposed wave will take a simpler form for accurate analysis. Since different cut-off bands for different wave patterns cannot be anticipated during propagation of the speech waves, a compromise cut-off band may be predetermined by frequency-transposing all quality and ranges of voices, and adjusting the cut-off region at the narrowest boundary of the spectrum band that embraces all the basic components of different phonetic sounds. This region however, will approximate at the twentieth harmonic of the reference fundamental frequency; this value may even be narrowed with satisfactory results. In a system wherein the frequency-transposed wave patterns are matched with standard wave patterns, the above indicated cut-off band may be filtered out conventionally. Whereas in a system wherein the different fixed-frequency components are selected from within the above indicated boundary, the filter section may be dispensed with. To further facilitate accuracy of phonetic selection, the original speech wave may be divided into two groups of voiced and unvoiced stop sounds, such as indicated by Dudley in Fig. 1 of U. S. Patent No. 2,195,081 March 26, 1940, wherein, the output of block 24 may be utilized to allow the printing operation of only the voiced sounds, and the block 38 to allow the printing operation of only the unvoiced sounds. It may also be arranged that, in combination, certain unvoiced sounds, for example the sound *"s,"* may be selected directly from the original speech waves, since such sounds represent much higher frequencies than other sounds.

In consideration of the advantages accrued from above indicated frequency-transposition and standardization thereof, there still remain some variables that must be controlled by further means. This may be achieved by a two dimensional device described herein, which utilizes a cathode beam that is deflected angularly from plurality of directions, by proportional amounts corresponding to the amplitudes of various frequency components derived from the speech waves, and according to the resultant deflected positions of the beam lying between predetermined limits of orientation, there are derived discrete signals representing the phonetic sounds. As stated above however, these predetermined limits of orientation of the beam will vary widely, for each phonetic sound, due to the different quality of voices; but without effecting cross talk, at least for practical purposes. Accordingly, these variations are compensated for, by assigning numerous predetermined positions of the beam to represent each phonetic sound, so that a suitable printing device may be made to describe the same phonetic character, by the output signal derived from any of those beam positions.

In one mode of extracting the fundamental frequency from the speech waves, as disclosed in my Patent No. 2,613,273, October 1952, and copending application, Serial No. 268,243 filed January 25, 1952, the one cycle markings are derived by detecting the successive major peaks of the propagated wave. These major peaks are produced by the succession of air puffs from the glottis, as indicated in the foregoing. For example, as each puff of air enters the resonant cavities of the vocal tract, there forms a high peaked surge, which produces the first constituent wave of a wave pattern, higher in amplitude than any of the other waves contained therein. Similarly, the puffs of air are in forward (pushing) direction, which indicates that these major peaks are always in the same direction. Thus, by pre-polarizing the incoming waves, from microphone input to the point of analysis, the major peaks can be detected to mark the arrival and ending of any wave pattern, for subdividing the speech waves into one cycle portions of the fundamental frequency. The mode of wave analysis thereon may depend upon the choice that is most suitable for the purpose.

In my above mentioned patent, there is disclosed a method of distinguishing between the wave patterns produced by different phonetic sounds, without utilizing frequency transposition of the original speech waves. This had been possible due to the fact that, the wave patterns produced by one phonetic sound always differs from the wave patterns produced by another phonetic sound; even though they vary in shape due to different qualities of the speaking voice. For reference purpose, the method employed in that disclosure provides the following steps: Subdividing the speech waves into wave trains of minor wave-peaks that occur between major-peaks, producing electric quantities proportional to said peaks, distributing said quantities sequentially into four groups, accumulating the totals of those distributed to each group during one wave train, thereby producing four totalized quantities whose relative magnitudes when the wave train ends depend upon the pattern of relative magnitudes of minor peaks within that wave train, producing a ray, deflecting that ray in a first direction according to the difference between two of the totalized quantities, simultaneously deflecting that ray in a second direction perpendicular to the first direction according to the difference between the other two of the totalized quantities, thereby producing a resultant deflection whose orientation is a function of the ratio of the two differences aforesaid, selectively assigning the resultant deflected positions of the ray lying between predetermined limits of orientation, as representatives of phonetic characters of the speech waves, and selectively deriving discrete signals from last said positions of the ray corresponding to phonetic characters of the speech wave. From the steps of operation given above, it may be seen that the orientation of said ray will be different for each phonetic sound; even though its angular position may vary due to different qualities of the speaking voice. However, these variables may be reduced to a single known, by placing several target sectors, for each phonetic sound, at predetermined directions from the undeflected path of the ray, and shunting them electrically, so that the ray impinging upon any one of these target sectors will produce the same output signal representative of a particular phonetic sound. The method of sampling during each wave pattern may be performed differently than described above, for example, as illustrated in Fig. 1 at C, wherein: 1, the samples may be measured from a reference minimum level to the peaks (minor and major) at points as indicated by the vertical lines; 2, the samples may be measured differentially between minor peaks as indicated at *c*; and 3, the time lengths between the peaks (as indicated at *d*) may be first measured and translated into amplitude samples, for the final storage aforesaid.

In my above mentioned copending application, there had been disclosed a second method of wave analysis, which utilized frequency transposition of the original speech waves, before final wave analysis is completed. For reference purpose, the method disclosed provided the following steps: Producing speech waves, assigning a reference frequency as a known fundamental frequency, shifting all frequency components contained in the speech waves to frequency regions where they are all based on the reference frequency, selecting sets of frequency components of importance from the transposed waves, deriving significantly different quantities from last said sets of frequency components, and totalizing said quantities in a manner as to obtain a different step of quanta for each set of totalized quantities, whereby each step of said quanta may be represented as a discrete signal for the operation of printing mechanism of phonetic letters.

In view of the closely related inventions just mentioned, some of the circuit arrangements disclosed herein, for example, the part in which the speech wave is subdivided into wave trains as one cycle portions of the fundamental frequencies, or the ratio meter, may be employed in conjunction with any of the two individually, but mainly these circuit arrangements are devised as improvements over the apparatus disclosed in my patent issue, No. 2,613,273.

Figure 2:
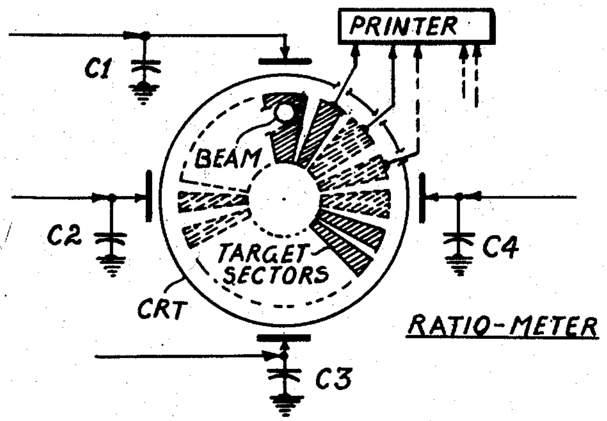
Figure 7:
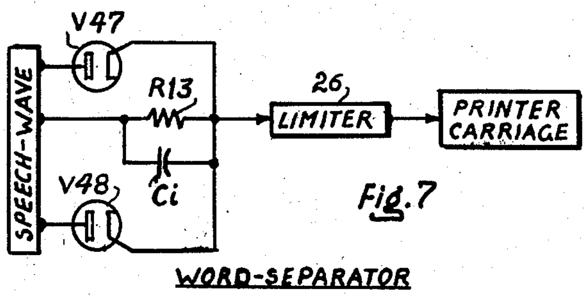
Figure 3:
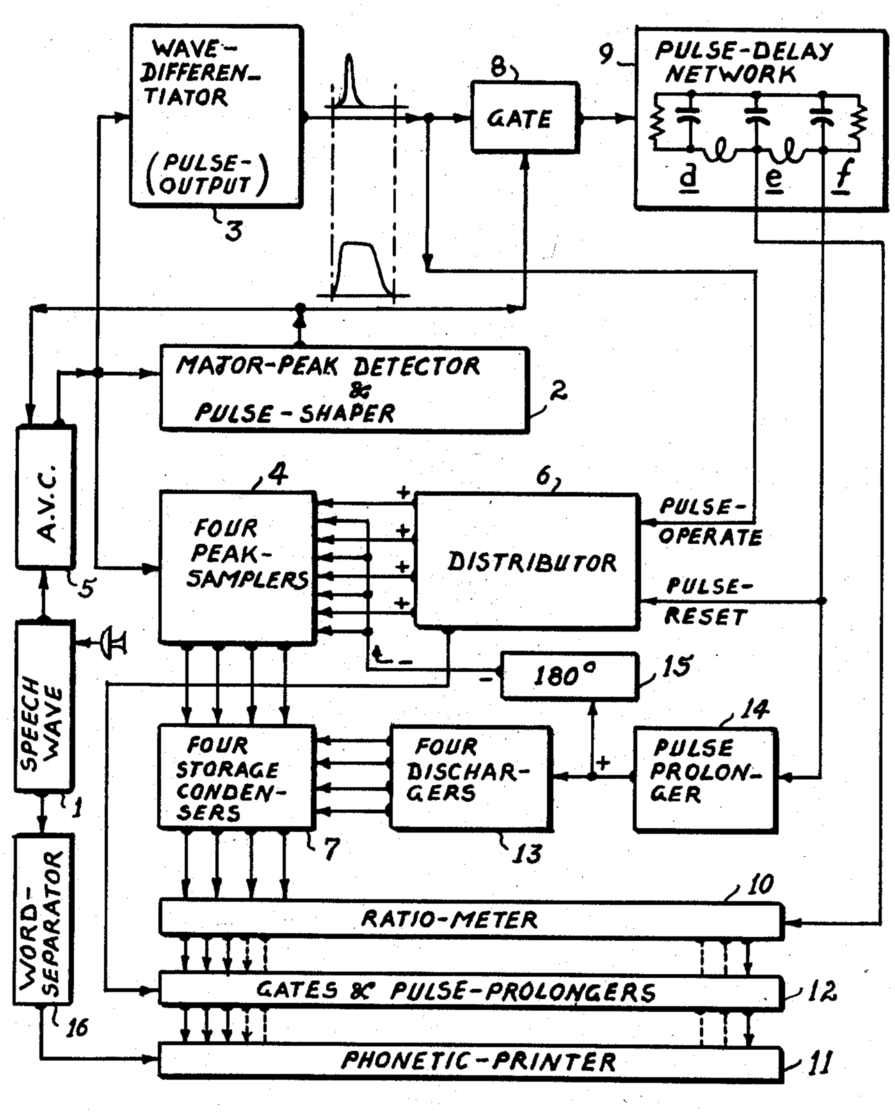
Figure 4:
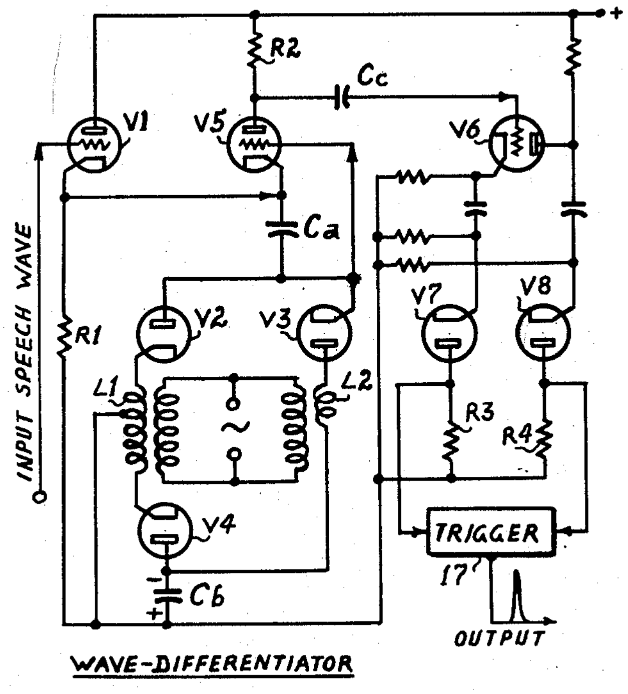
Figure 4A:
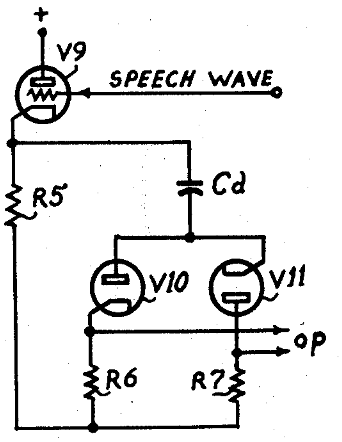
Figure 11:
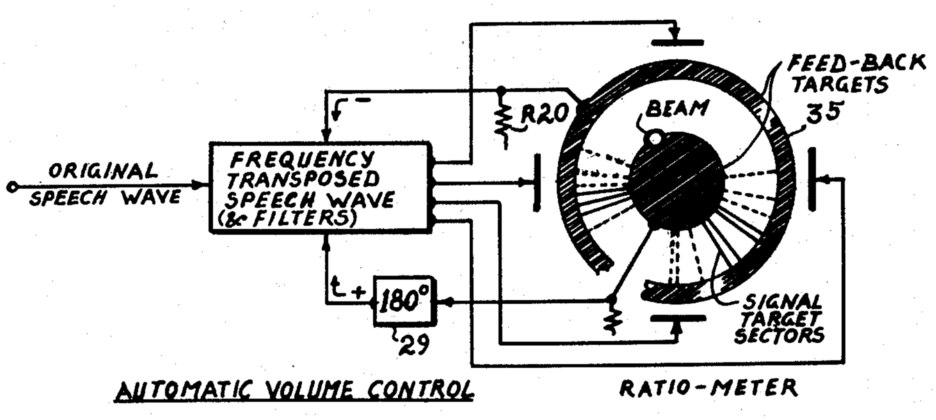
Figure 5:
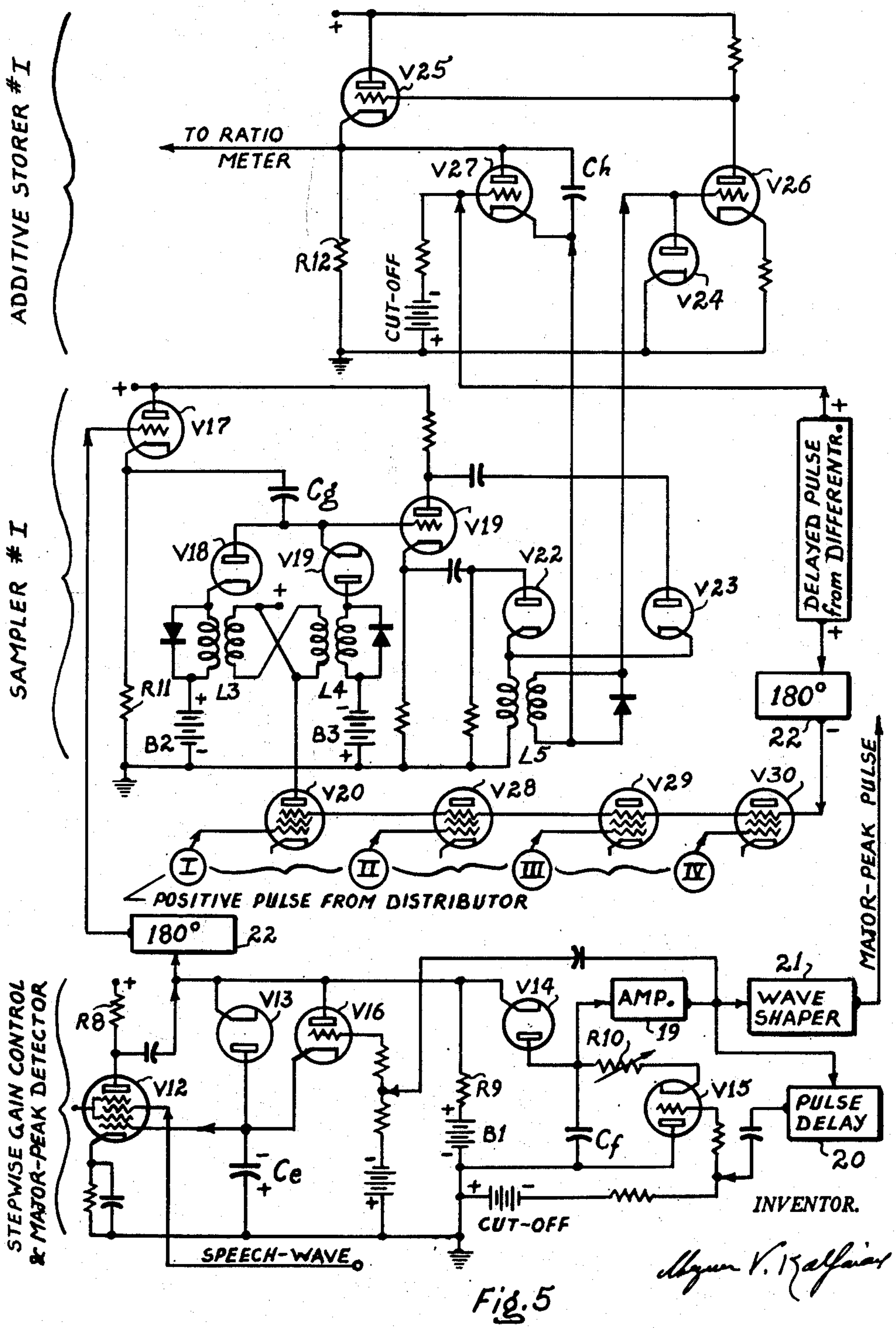
Figure 6:
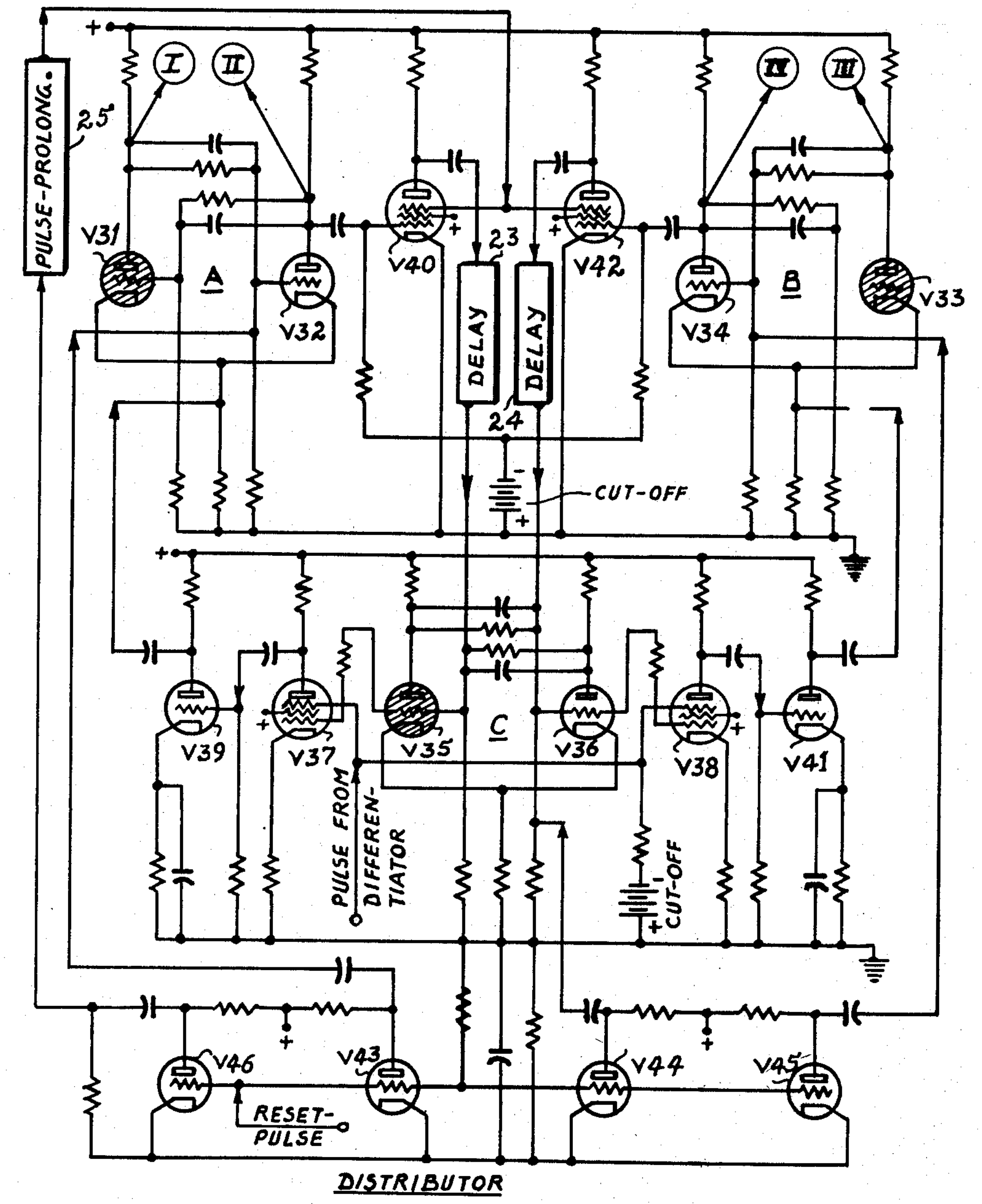
Figure 8:
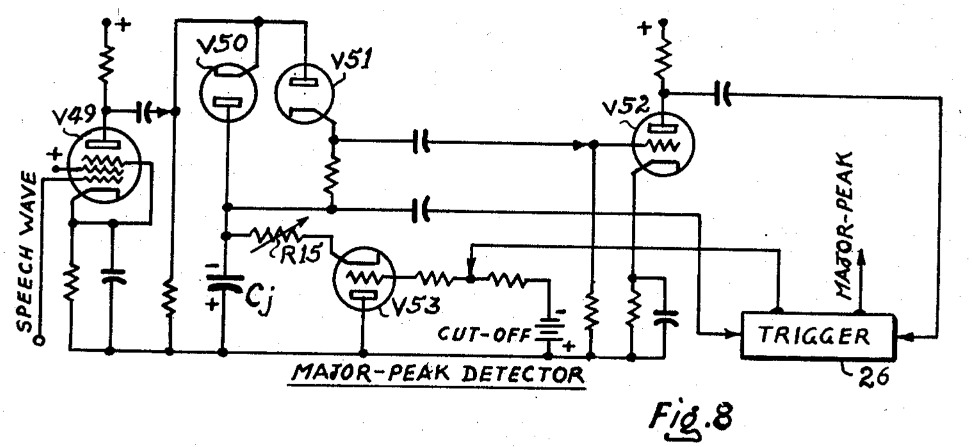
Figure 9:
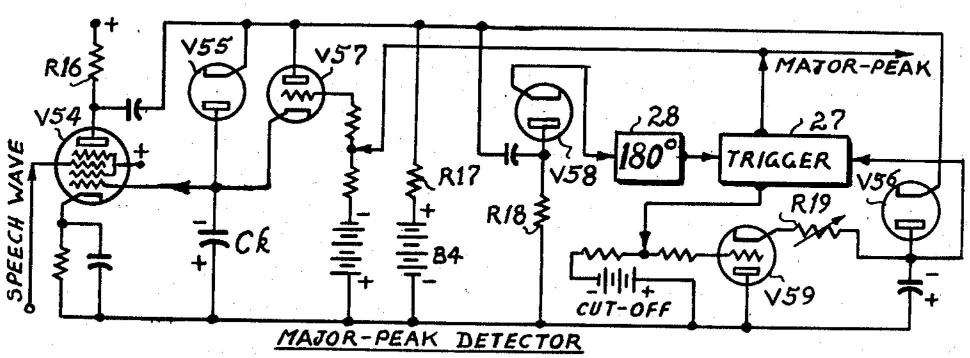
Figure 10:
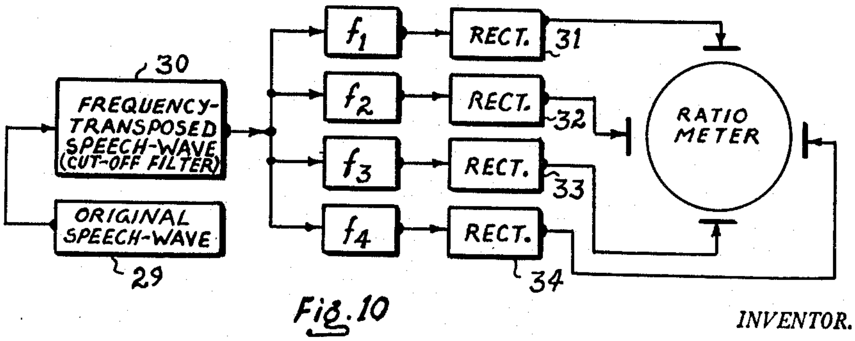

In the drawings:

Figs. 1, A to C are waveforms of speech waves, describing the invention; Fig. 2 is a ratio meter in accordance with the invention; Fig. 3 is a block diagram of the speech wave analyzer and phonetic printer in accordance with the invention; Figs. 4 and 4*a* are schematic diagrams of wave differentiator in accordance with the invention; Fig. 5 is schematic diagram of a combined arrangement of major-peak detector, signal-sampler, and sample-adder in accordance with the invention; Fig. 6 is a schematic diagram of signal distributor in accordance with the invention; Fig. 7 is a schematic diagram of word separator in accordance with the invention; Fig. 8 is a modification of the major-peak detector; Fig. 9 is a further modification of Fig. 8; Fig. 10 is a modification of the speech wave analyzer; and Fig. 11 is an automatic volume control of the speech wave amplifier.

*Ratio meter*

In Fig. 2, the sampled voltages obtained from a group of waves (representing a wave-pattern) are distributed among four storage condensers C1 to C4, additively in sequential rotation. The totalized voltages across these condenser are then applied upon the two pairs of electrostatic beam-deflecting plates of a cathode ray tube, to deflect the electron beam angularly from its normal central path, the orientation of which deflection is a function of the ratio of the differences between the four totalized voltages. Since the waveshape of different wave-patterns representing different phonations are definitely different one from another, the angular displacement of the beam from its normal path will also be different for each group of totalized samples; representing a different phonation, as long as the original spoken sound is intelligible to the mechanism of human interpretation. Accordingly, we may place a plurality of independent targets (as many as phonetic characters that are to be utilized in the final printing) in the path of the electron beam, oriented such as each to have its longer axis aligned with the radius of the circle, at such pre-determined positions, as the output signal of each target to represent a specific phonation. Spacings between these independent target sectors will not be equally distributed, but the spacings between points of beam-impingement representative of specific phonations will be wide enough to allow some variation in angular deflection of the beam without it causing cross-talk between the adjacent targets. In some instances, the angular displacement of the beam for a particular phonetic sound will be shifted widely due to the complexity of the wave-pattern, but without manifesting cross talk between other phonetic sounds. For this reason, the whole target may be constructed by mutually insulated thin stripes, so that pre-arranged stripes may be electrically connected in parallel, to ensure operation for final printing. To further facilitate accuracy, blank areas between predetermined limits of beam-orientation may be allowed between target sectors, so as to avoid output signals at points where the beam may be deflected by obscure wave patterns. Output signals of the independent target sectors may then be applied upon independent solenoids, to actuate alphabetical printing keys, such for example, the keys of a modified typewriter, for final phonetic printing. The target sectors may also be divided into coded sections (narrow enough to collectively intercept the beam stream), so that coded signals may be applied upon the code bars of a printing device, for example, the teletypewriter device, for final printing. Such an arrangement had been disclosed in my copending application, Serial No. 323,873 filed December 3, 1952.

*Block diagram of the speech wave analyzer*

In Fig. 3, the original speech wave in block 1 is simultaneously applied upon the major-peak detector 2; wave-differentiator 3; and four peak-samplers 4. Output gain of the speech wave is automatically controlled step by step at the end of each wave pattern, in block 5, so that the beam deflection of the ratio meter, as given in Fig. 2, will be held approximately in the range of the targets. The major-peak detector 2 produces an output pulse (as indicated in the drawing) at the end of each major peak. The wave-differentiator 3 produces an output pulse (narrower in width than the output pulse of the major-peak detector, as shown) at the end of each minor-peak and major-peak, but at slightly later time interval than the production of the major peak. Output pulses of the wave-differentiator 3 are applied upon the trigger-distributor in block 6, which triggers in sequential rotation, and operates the four peak-samplers in block 4, in respective rotation, for additive storage of the samples, in the four storage condensers in block 7. The chain operation of the distributor 6 is necessary for the inclusion of all the samples in the wave-pattern in the final totalized quantities; since in most wave-patterns there will occur more than four minor peaks between the major peaks.

When a major-peak of the speech wave arrives, the major-peak detector 2 operates and applies a wide pulse upon the gate 8, rendering it operative, so that the immediately following output pulse from the wave-differentiator 3 is admitted therethrough and applied (in positive polarity) upon the pulse-delay network in block 9. At this time, the distributor 6 is operated, whereby the last sampling operation is performed. When this last operation is completed, the input positive pulse of delay-network 9 travels from terminal *d* to *e*, which causes operation of the ratio meter 10, by raising its highly biased negative potential upon the beam-intensity control grid to cathode potential. Immediately, the electron beam of the ratio meter 10 starts to flow from its normal blanked state, which under the influence of the four totalized deflection-potentials, impinges upon a particular target sector representing the original phonation, which in turn produces an electrical pulse and causes the operation of a predetermined key (solenoid) of the phonetic printer 11, such as an electric typewriter with provision of independent input terminals. The pulse-prolonger 12 is included in the arrangement, because the output signal of the ratio meter is too short for mechanical actuation of the printer. After electrical storage in bock 12 is established, the pulse in delay-network 9 travels from terminal *e* to *f* (rendering the ratio meter inoperative), and applies upon the distributor 6 to re-set it into normal operating position; and simultaneously upon the dischargers in block 13, to discharge the totalized samples in block 7, for a new start of wave-pattern analysis. In order to avoid erroneous sampling and insufficient discharge of the condensers in block 7, the delayed pulse is prolonged in block 14 before being applied upon the dischargers, and also, this pulse is applied upon the samplers in block 4, in negative polarity, through phase inverter block 15, whereby the samplers remain inactive while the distributor is being re-set to normal operating position.

Owing to the fact that in a single phonation there are produced several recurrent wave patterns, the contact points of armatures of the phonetic printer key-relays may be so wired that, once a key is operated, it locks in, its electrical connection, until another key is operated. For simplicity of apparatus however, the modified wiring may be eliminated, since the pulse-prolonger, which may be a condenser across each solenoid of the printing keys, will avoid such repeated operation of the printer.

In order to allow spacing between printed words, such as in ordinary typing, a word separator 16 is included in the arrangement. This word separator produces an output signal whenever the average volume of speech sound is above zero level. Hence by pre-arrangement, either commencing or ending the sound volume, the output signal of block 16 is applied upon the printer 11 to move the printing carriage an extra space forward.

*Wave differentiator*

As described in the foregoing, the wave trains are sampled at intervals corresponding to each succeeding wave peak, and these samples are distributed additively across four storage condensers in a predetermined sequence. If it were the case that each constituent wave reversed in polarity, such reversal could be utilized to produce independent output pulse and operate the distributor triggers at the proper instant. However, a complex wave as shown in Fig. 1, consists of both alternating and pulsating unidirectional waves, which must be first differentiated for the operation of the distributor at the proper instants. The differentiator circuit arrangements given in Figs. 4 and 4*a* are suitable for this purpose.

In Fig. 4, the speech wave is applied upon the control grid of a cathode follower tube V1, which causes proportional voltage variations to appear across cathode circuit impedance R1. The peak output voltages across R1 are stored in condenser *Ca* periodically, through diodes V2 and V3, in series with the inductances L1 and L2. The alternating voltage across lower half of coil L1 is rectified through diode V4, and charged across bypass condenser *Cb*, the steady state potential of which acts as negative bias in series with the diode V3. An alternating voltage at a frequency several times the highest frequency occurring in speech wave, and having an approximate amplitude equal to or higher than the highest input signal voltage, is applied across coils L1 and L2, in like polarities, and of equal amplitudes. Thus, the condenser *Ca* is charged in magnitude equal to the voltage across R1 plus the peak positive voltage across L1. Impedance of the lower section of coil L1 is adjusted to be twice that of the upper section, so that the negative bias developed across *Cb*, upon V3, is twice the peak voltage produced across coil L2. Thus, due to this bias voltage across *Cb*, condenser *Ca* is prevented from being discharged through V3 when the voltage across L2 is at the positive peak. However, if at this positive peak the voltage across R1 had changed in the negative direction, the cathode of diode V3 will be more negative than at the anode terminal, causing it to conduct and discharge the condenser *Ca* rapidly until the cathode-anode potential of V3 is again zero. Similarly, when at the negative peak across coil L1 the voltage across R1 had changed in the positive direction, the anode terminal of diode V2 will be more positive with respect to its cathode terminal, causing it to charge *Ca* rapidly, until zero stabilization across V2 is reached. Thus, at the alternating peaks across coils L1 and L2, the condenser *Ca* is either charged or discharged depending upon the direction in which the voltage across R1 changes. When the alternating voltage across coils L1 and L2 is in the radio frequency range, the charge and discharge across *Ca* will be in short pulses, which are applied upon the control grid of amplifier tube V5, for further amplification in the output circuit, comprising R2 and a small coupling condenser *Cc*. The operation of tube V5 will cause degeneration across R1, but not of sufficient magnitude to nullify the output signal; especially when a high impedance tube is chosen for V5.

The current through output resistance R2 is in the form of a series of unidirectional pulsations, which change in direction suddenly at the peaks of the incoming speech wave. These series of pulsations are changed into single short pulses by the following arrangement: The output pulses of V5 are applied upon the control grid of phase-inverter tube V6, the plate and cathode outputs of which are independently applied upon the diodes V7 and V8. These diodes are connected in like poles, so that current flows through each, at a time, depending on the pulse-polarity at the input of V6. The pulsating negative voltages across R3 and R4 are applied independently upon the left and right sides of a trigger circuit in block 17, which alternates its state of conduction only when a negative voltage is applied upon the conducting side. Thus, the trigger 17 alternates its state of conduction at intervals corresponding to each succeeding wave-peak of the incoming speech wave. When the cathodes of both trigger tubes are connected in parallel, leading to ground through a common resistance, the output at this common terminal will be unidirectional pulses in either positive or negative polarity (positive being the first pulse), which pulses are utilized as the output pulses of block 3 in Fig. 3.

A simpler circuit arrangement of wave-differentiator is shown in Fig. 4*a*. The speech wave is applied upon the control grid of cathode follower tube V9, which causes proportional voltage variations to appear across R5. The output voltage variations across R5 are full-wave rectified through diodes V10 and V11, in series with the condenser C*d*, and resistances R6 and R7. The RC time constant (C*d* in series with R6 or R7) is adjusted to one half cycle period of a frequency which is equal to or higher than the highest frequency occurring in the relatively low frequency speech wave, so as to avoid time lag of charge or discharge in condenser C*d*. Initially, the condenser C*d* is charged in magnitude equal to the potential across R5, and therefore, the voltages across diodes V10 and V11 are zero. When the potential across R5 changes in positive direction by the incoming speech wave, the anode terminal of V10 will be more positive than at its cathode terminal, thereby causing current flow through this diode and resistance R6. When the potential across R5 changes in negative direction by the incoming speech wave, this time current will flow through diode V11 and R7. Thus, current will flow through R6 and R7 independently, depending upon the direction in which the voltage changes across R5. The outputs of R6 and R7 are then mixed and changed into unidirectional pulses for the operation of the distributor circuit.

*Stepwise gain control of the speech wave; major-peak detector; differential wave-sampler; and additive storage of samples*

In reference to the ratio meter given in Fig. 2, it was described in the foregoing that the beam impinges upon one of the elemental targets at the arrival of a major peak of the speech wave. In order to prevent the beam from being deflected too close to the center, or outside the periphery of the circular target, a non-critical gain control of the incoming speech wave is included in the arrangement. In this arrangement, it is advantageous that the gain control be stepwise, e. g., the gain is adjusted instantaneously at the arrival of each major peak of the speech wave.

It had been described in the foregoing that there are used four samplers, and four storage condensers in which the samples are stored additively in a rotational sequence. Since all four of these devices are functionally the same, only one typical example is shown in the drawing of Fig. 5. Also, the circuit arrangement is given for sampling differential amplitudes of the constituent waves in a wave pattern; although the time differences between constituent waves may be first translated into representative amplitude variations, and sampled in the previous manner, as mentioned in the foregoing.

For stepwise gain control, the incoming speech wave is applied in positive polarity upon one of the control grids of modulator tube V12, which amplifies the input signal across anode circuit resistance R8, in negative polarity. The peak of the latter voltage is stored in condenser C*e*, through diode V13, and applied upon the control grid of modulator tube V12. Thus, a large degeneration may be effected by the application of negative potential from across condenser C*e* upon the control grid of V12. In order to effect stepwise degeneration, the current through diode V13 is normally prevented by a predetermined value of positive potential from across B1, until the negative signal voltage across R9 exceeds this value. Thus, the normal signal gain in tube V12 may be considered to be very large, until the potential across R9 exceeds the predetermined potential of B1, whereupon, a large negative potential rises across C*e* to suppress further gain of V12. The Q of C*e* is normally high, and therefore, the gain of V12 is held constant thereafter, at such value, as determined by the approximate potential of B1. In an independent circuit, similar steady state potential is built up across condenser C*f* through diode V14, and the major-peak is derived from this condenser during its charging action. To effect succeeding output signals representative of major peaks, the charge across this condenser is forcefully dissipated by a small amount, after each initial charge, so that it may be re-charged by the succeeding major peak, and produce an output signal representative of the major peak. As an example, the initial charge across C*f* will be amplified through block 19, in the form of a pulse; delayed in block 20, thereby to allow time for the completion of the charge; and the delayed positive pulse then applied upon the control grid of normally inoperative discharger tube V15, so as to render it conductive and discharge the condenser C*f*, by a pre-determined quantity, as controlled by the series connected resistance R10. The output pulse is prolonged in block 21, in the form as described by way of Fig. 3. In order that the charge across C*e* may be re-adjusted after each major peak, a positive pulse from amplifier 19 is also applied upon the control grid of normally non-conductive tube V16, so as to render it conductive and discharge C*e*, in the case when its cathode is negative with respect to anode, until cathode-anode potential of tube V16 is zero.

The gain controlled output voltage across resistance R8 is phase inverted in block 22, and applied upon the control grid of cathode follower tube V17 of the sampler circuit. This signal voltage appears across cathode circuit resistance R11, the voltage of which is charged correspondingly across condenser C*g*, through diode V18 and V19, during distributor pulses applied upon the pulse-coils L3 and L4. Batteries B2 and B3 have the same potential, which is adjusted to be equal to or higher than the positive voltage appearing across R11. The distributor pulse (assuming in this case to be the first pulse I) is applied upon the gate tube V20, which in turn effects corresponding pulses of unlike polarities across pole-inverted coils L3 and L4. The magnitude of these pulses is adjusted approximately equal to the voltages across batteries B2 and B3.

In operation, when a pulse is induced in coils L3 and L4 (the cathode end of diode V18 being driven negative with respect to its anode, and the anode end of V19 being driven positive with respect to its cathode), the condenser *Cg* is charged in magnitude equal to the potential across R11, after which action, the currents through diodes V18 and V19 remain zero, due to the large bias batteries B2 and B3. Thus, any change in potential across R11, during the absence of pulses from the distributor, will not disturb the previously stored quantity in *Cg*. But at the arrival of the following distributor pulse I, the condenser *Cg* will either be charged or discharged by a quantity, corresponding to the amount of voltage-difference between the last significant peak and the new peak of the speech wave, e. g., the magnitude of change across condenser *Cg* is equal to the differential magnitude between the last two significant peaks, which may be directly applied upon the final storage condenser for additive build-up.

For additive build-up of the differential signals across four storage condensers, the output signals of condenser *Cg* are first changed into unidirectional pulses in output coil L5, by the phase inverter tube V21, and diodes V22, V23, the output of which is applied upon the condenser *Ch* for additive storage. Initially, the condenser *Ch* is charged through diode V24, equal to the potential across resistance R12 of the cathode follower tube V25. Accordingly, the anode terminal end of diode V24 is at ground potential, which causes the cathode follower tube V26 to conduct at some stable state. Due to the direct connection of anode terminal of this tube to the control grid of V25, the latter tube increases its state of conduction. But since this increase also causes similar increase in condenser charge, the grid of V26 is constantly held at ground potential and both tubes conduct as some stabilized states. Now assuming that a pulse of certain magnitude is induced in coil L5, the condenser *Ch* immediately charges by the same magnitude through diode V24, but simultaneously the grid of V26 is held at ground potential by the opposing potential across coil L5 to prevent any change of conduction of V25 and V26. When the pulse across L5 subsides, the control grid of V26 becomes negative, and causes tube V25 to increase its conduction without disturbing the charge of condenser *Ch*, until the grid of V26 is at ground potential. At this stage, the tubes V25 and V26 are again stabilized, but the conduction of V25 is now higher than it had previously, by a proportional amount equal to the induced pulse in coil L5. Thus, the succeeding pulses in coil L4 are added in condenser *Ch*, until a major peak from the speech wave arrives, at which time a positive reset pulse is applied from the wave-differentiator (after time delayed) upon the control grid of discharger tube V27, to discharge condenser *Ch* for a new start. Simultaneously, the positive pulse (time delayed) from the wave differentiator is phase inverted through block 22, and applied upon the second control grids of gate tubes V28, V29 and V30, so as to prevent erroneous sampling while the distributor is re-set to normal operating position. The diodes across L3, L4 and L5 are used to prevent self oscillation in these coils.

*Distributor circuit*

The distributor circuit consists of two flip-flop triggers A and B, comprising V31, V32 and V33, V34. Trigger A produces the first two output distribution pulses I and II, while trigger B produces the second two output distribution pulses III and IV. Since each trigger is arranged to produce two output pulses, a third trigger C, comprising V35 and V36 is included in the circuit to blank out the operation of one trigger while the other is in operation. This condition is achieved by applying the incoming pulses from the speech wave differentiator upon the triggers A and B, through gate tubes V37 and V38 which are either on or off at a time, as determined by the state of conduction of trigger C.

The conduction states of triggers A, B and C are initially set as shown in the drawing; the shaded tubes being the conducting ones. The control grid of V35 of trigger C is directly connected to the first control grid of gate tube V37, and the control grid of V36 of the same trigger is directly connected to the first control grid of gate tube V38. Thus according to the states of trigger conduction as shown, the incoming positive pulse from the wave differentiator is admitted through gate tube V37, but prevented from passing through gate tube V38.

For sequential operation, the first incoming positive pulse appears in negative polarity across the anode circuit of gate tube V37, which after passing through the phase inverter tube V39, is applied upon the cathode terminals of V31 and V32 of trigger A. At the arrival of this positive pulse, the state of conduction of trigger A reverses, and the anode circuit of V31 transmits the first positive pulse I to the first of four samplers in block 4 of Fig. 3, for operation. At the arrival of the second positive pulse from the wave differentiator, the trigger A again reverses its state of conduction, and this time the tube V32 transmits the second positive pulse II from its anode circuit, to the second of four samplers for operation. Simultaneously, the trigger tube V32 applies a positive pulse upon the first control grid of normally non-conductive tube V40, which operates and transmits from its anode circuit a negative pulse upon the control grid of trigger tube V35, to reverse the state of conduction of trigger C. In order to prevent operation of trigger C while the incoming pulse from the wave differentiator is still imposed upon the second control grids of gate tubes V37 and V38 in parallel, the negative pulse from exciter tube V40 is delayed in block 23. Thus, when the pulse from the wave differentiator has subsided, and the delayed negative pulse arrives upon the control grid of trigger tube V35, the trigger C reverses its state of conduction, and at this time, the gate tube V37 is rendered non-operative, while the gate tube V38 is prepared to admit the following pulse from the wave differentiator. In order to prevent active pulses from appearing at the anode circuits of gate tubes V37 and V38 while the trigger C is changing its state of conduction, the second control grids of these gate tubes are normally biased to anode current cut-off.

When the third positive pulse arrives from the wave differentiator, the gate tube V38 transmits a negative pulse from its anode circuit to the control grid of phase inverter tube V41, which in turn applies a positive pulse upon the cathode terminals of trigger tubes V33 and V34. The trigger B reverses its state of conduction, and V33 transmits the third positive pulse III from its anode circuit, to the third of four samplers for operation. On arrival of the fourth pulse from the wave differentiator, the trigger B operates again, and V34 transmits the fourth positive pulse IV upon the fourth of four samplers for operation. Simultaneously, the trigger tube V34 applies a positive pulse from its anode circuit upon the first control grid of normally non-conductive exciter tube V42, which operates and transmits from its anode circuit a negative pulse upon the control grid of trigger tube V36, through delay circuit 24, to reverse the state of conduction of trigger C, whereby the sequence of pulse transmission continues in a mode of chain operation.

At the end of a wave-pattern when a re-set pulse arrives at the control grids of V43, V44, V45 and V46 (from the pulse delay block in Fig. 3), these tubes apply negative pulses from their anode circuits upon the control grids of trigger tubes V32, V34 and V36, so that triggers A, B and C are re-set to their normal states of conduction, for a new start of signal distribution. In order to prevent delayed pulses forming in blocks 23 and 24 while triggers A and B are being re-set to normal operating positions, a simultaneous negative pulse is applied upon the second control grids of exciter tubes V40 and V42, from the anode circuit of V46. This negative pulse is prolonged in block 25, to make sure that exciter tubes V40 and V42 remain inoperative during the period of re-setting the triggers.

*Word separator*

The word separator circuit consists of rectifier and RC network, for producing output signals during spoken words. In Fig. 7, the speech wave is rectified by the diodes V47, V48, and charged across condenser *Ci*. The time constant of *Ci* and R13 is adjusted to equal about the shortest time period that the speaker may pose between spoken words; cancelling out the higher frequencies. Thus, the output of *Ci*—R13 after passing through the amplitude limiter 26, its shape will approximate to that of square waves of varying lengths, which are applied upon a relay circuit to actuate and move the printer carriage one step forward after each spoken word, or syllable, in some erroneous cases.

*Modified arrangement of the major-peak detector*

In selecting the major peaks of speech waves, it had been mentioned in the foregoing that wave-patterns of the same phonetic sound as spoken by different pitched and qualities of voices will differ considerably. Moreover, the major peaks may not be distinguishable as highly as desired. As an example, two extreme cases of the sound "*ä*" are shown in Fig. 1, at A and B. The first sound is produced by a female voice having fundamental frequency of 229 cycles per second, and the second sound wave is produced by a male voice having fundamental of 110 cycles per second. In the first case, the ratio of amplitude differences between major-peaks and minor-peaks is substantially high. Whereas in the second case, the difference in amplitude between major peaks *a*—*b* and minor peaks *g*—*h* is very small, with the possibility of *g* or *h* being mistaken for major peak. While the percentage of correct selection of the major peaks will be higher than incorrect selection, and thereby nullify the possibility of incorrect printing in the final analysis of the speech wave, it is also desirable that the inaccuracies of major peak selection be minimized; especially in cases where extraction of the fundamental frequencies of the speech waves (for various purposes, for example, in spectrograph analysis such as disclosed in Patent No. 2,561,478, July 24, 1951, issued to Doren Mitcell, or otherwise) is desired. Such accuracy may be effected by first passing the original speech wave through square-law amplifier, which exaggerates the peak-differences. Such a practice is permissible, since as stated previously, selection of the major peaks is unidirectional, and only that direction of the wave is subject to square-law amplification.

Square-law amplifiers are known to the skilled in the art of electronics, and therefore, circuitry is not included herein. However, another modification of the major-peak detector is shown in Fig. 8. In this arrangement, the speech wave is applied upon the control grid of amplifier tube V49, which is preferably operated within its non-linear $G_m$ curve. As indicated in the drawing, direction of the applied speech wave is positive in which the major peaks are to be selected. The rising (negative) output peaks of V49 are stored in condenser *Cj* through diode V50, and during the storage action of the condenser it transmits negative signal (either directly or through amplifier) upon the right side of trigger circuit 26 for operation. At the instant of operation, output of that side of the trigger circuit produces a pulse representative of the major peak. When the rising (negative) voltage at the output of V49 reverses in polarity, the anode-cathode voltage-difference of diode V50 appears across R14 (through diode V51), the voltage of which is first phase inverted through V52, and applied upon the left side of trigger 26, to alter its state of conduction. Immediately, the left side of trigger 26 applies a positive pulse upon the control grid of normally non-conductive discharger tube V53, which becomes conductive and discharges part of the electrical quantity in condenser *Cj*, as controlled by the series-connected resistance R15. After such operation, V53 becomes non-conductive again, and any of the following negative signals from R14 becomes ineffective upon the trigger circuit, until when another major peak arrives at the grid of tube V49, which raises the potential of *Cj* and effects change in the state of conduction of the trigger 26, as described above. The resistance R14 is preferably of large value, so as to avoid more than tolerable amount of normal discharge of the condenser *Cj*. When stepwise gain control is desired to be had with the circuit arrangement of Fig. 8, then the circuit of Fig. 9 may be employed.

In Fig. 9, the incoming speech wave is applied in positive polarity upon one of the control grids of modulator tube V54, which amplifies the input signal across anode-circuit resistance R16, in negative polarity. The peak of the latter voltage is stored in condenser *Ck*, through diode V55, and applied upon the other control grid of modulator tube V54. Thus, a large degeneration may be effected by the application of negative potential (from across condenser *Ck*) upon the control grid of V54. In order to suppress the gain of V54 after a predetermined amplitude level, the current through diode V55 is normally prevented by a predetermined positive potential from across B4, until the negative voltage across R17 exceeds this value. Thus, the normal signal gain in tube V54 may be considered to be very high, until the potential across R17 exceeds the predetermined potential of B4, whereupon, a large negative potential rises across *Ck* to suppress any further gain of V54. The Q of *Ck* is normally high, and therefore, the gain of V54 is held constant thereafter, at such value, as determined by the approximate potential of B4. In an independent circuit, similar steady state potential is built up across condenser *Cm* through diode V56, and the major-peak is derived from this condenser during its charging action. During the charging process of condenser *Cm*, it applies a negative signal upon the right side of trigger circuit 27, the output of which side immediately transmits a positive pulse as a major peak, and another positive pulse upon the control grid of normally inoperative tube V57, to render it conductive and discharge *Ck* for re-adjustment, in the case when the amplitude of the new incoming major peak is lower than the amplitude of the preceding major peak. When the positive voltage at the output of V54 reverses in polarity, and also across resistance R18, current flows through V58, and negative voltage is applied upon the left side of trigger 27, through phase inverter 28, to alter its state of conduction. Immediately, output of the left side of trigger 27 applies a positive pulse upon the control grid of normally non-conductive discharger tube V59, which becomes conductive and discharges part of the electrical quantity stored in condenser *Cm*, as controlled by the series-connected resistance R19. After such operation, V59 becomes non-conductive again, and any of the following negative signals from R18 becomes ineffective upon the trigger circuit, until, when another major peak arrives at the grid of tube V54, which raises the potential of *Cm* and effects change in the state of conduction of trigger 27, as described above.

*Modification of the speech wave analyzer*

In my related copending application, Serial No. 268,243 filed January 25, 1952, I had disclosed methods and means for standardizing the frequency variables of the speech waves, of the type as mentioned in the foregoing. In the method described, all frequency components of the speech waves are shifted to frequency regions, where they are based on a single fundamental frequency. From there on, several frequency components are selected by filter circuits, the outputs of which are quantized to obtain discrete signals representative of the phonetics contained in the original speech waves. Instead of such quantization however, the ratio meter described herein, in Fig. 2, may be utilized, for the final operation of the printing device. Such an arrangement is shown in Fig. 10, wherein, the speech wave in block 29 is first frequency transposed in block 30, such as described in my above mentioned application. The output of frequency transposer is applied upon four frequency-selective circuits $f_1$ to $f_4$ respectively, which are resonated to the frequencies of importance that collectively compose the phonetic sounds. The outputs of these frequency selectors are further rectified in blocks 31 to 34 respectively, and their outputs are applied upon the four beam deflecting plates of the ratio meter. Then, the output of the ratio meter is utilized to operate a phonetic printer, as described in the foregoing. The arrangement of Fig. 10 had also been disclosed, in modified form, in my related application Serial No. 323,873 filed December 3, 1952. In this application, the circuit arrangements provided division of the voice spectrum into more frequency bands than the four bands, as shown herein; thus requiring more than four beam-deflecting plates of the ratio meter. It is also possible however, to divide the voice spectrum into many narrow-bands, and distribute the outputs of these narrow-band filters among the four (or other desired number) beam-deflecting plates; or magnetic cores, as the case may be.

As indicated in the foregoing, the block 1 (speech wave) in Fig. 3 may be represented by the frequency-transposed speech wave 30 in Fig. 10. Also, the block 5 may be eliminated when automatic volume control of the type shown in Fig. 11 is employed.

*Modification of automatic gain control*

A simple arrangement of automatic gain control of the speech wave may be provided for, by including a feed-back target 35 around the target sectors of the ratio meter, as shown in Fig. 11. When the amplitude level of the incoming speech wave is very high, the beam will be driven against the feed-back target, causing partial current to pass therethrough. Immediately a large negative voltage will be developed across the output resistance R20, and applied upon the input of the speech wave amplifier, to reduce its gain. Thus, the beam will graze the feed-back target 35 without passing therethrough, no matter how high the amplitude of the incoming speech wave is; provided of course, that a large negative voltage can be developed across R20, and the gain of the amplifier can be varied widely. Instead of utilizing the feed-back target 35, an auxiliary target 36 may be placed in the normal path of the beam. In this case, the output voltage of target 36 is reversed in polarity by the block 29, and applied upon the input of the speech wave amplifier. Thus, the beam normally falling upon the target 36, the gain of the speech wave amplifier is increased until the beam is driven away from the target, whereupon, the gain drops suddenly, and causes the beam just to graze the target 36. Either one of the feed-back targets (35 or 36) may be utilized independently, or simultaneously, in conjunction with the ratio meter.

In view of the various possibilities of different modes of operation, as described in the foregoing, it will be obvious to the skilled in the art that, various substitutions of parts, adaptations and modifications are possible without departing from the spirit and scope thereof.

What I claim is:

1. In a system of speech wave analysis: A source of speech waves; a wave differentiator for signalling the arrival of significant peaks of the speech waves; a major peak detector for signalling the arrival or ending of speech wave patterns; sampler means for sampling the differential amplitudes between said peaks; four storage means; four discharging means associated with the four storage means; a continuous distributor means, and means therefor for distributing said samples among the four storage means sequentially for additive storage; a ratio meter comprising a source of electron ray, and a plurality of ray deflecting means around said ray; means for applying the totalized samples of said four storage means upon said ray deflecting means of the ratio meter differentially, whereby to deflect the beam angularly whose orientation is a function of the ratio of the differences of the four totalized quantities; means for assigning various angular deflections of the beam, as obtained after the endings of different wave patterns, representative of phonetic characters in the speech waves; means for deriving discrete signals from said ray at various last said deflections representative of phonetic characters in the speech waves; pulse-delaying means having first and second time delay terminals; means for deriving a signal pulse from the major peak detector, at major peak; means for applying last said pulse upon said delay means; a phonetic letter-printing means; coupling means between said various discrete signals of the ratio meter and the various letter-printing keys of the phonetic printer; means for applying the delayed pulse from said first terminal upon said coupling means, whereby to initiate operation of one of said keys, as represented by the incoming wave pattern at the arrival of said major peak; and means for applying the delayed pulse from said second terminal simultaneously upon the distributor and four discharging means for setting the distributor to a normal operating position, and discharging the four storage means, for repeated operation aforesaid.

2. In a system as set forth in claim 1, which includes means for measuring the power level of the incoming speech waves; and according to such measurement, means for advancing the letter spacing of said phonetic printing means, whereby word separation of the printed letters may be effected.

3. In a system as set forth in claim 1, wherein said distributor comprises first, second and third trigger circuits, each trigger having first and second operating states; first and second gates; means for applying said derived pulse from said major peak detector upon the first and second triggers simultaneously for operation through the first and second gates; first and second coupling means between the first and second gates and the third trigger, so coupled that, the signal pulse from said major peak detector is admitted through the first gate only when the third gate is in its first state of operation, while said pulse is admitted through the second gate only when the third trigger is in its second state of operation; coupling means between the first and third triggers so coupled that, the third trigger is triggered to its second state of operation after the second state of operation of the first trigger; coupling means between the second trigger and the third trigger, so coupled that, the third trigger is triggered to its first state of operation after the second state of operation of the second trigger, whereby admittance of said signal pulses through the first and second gates are switched alternately, allowing sequential operation of the first and second triggers with respect to their first and second states; means for deriving sequential first and second output signals from the first and second triggers; and means for setting the first, second and third triggers into normal operating states for repetition aforesaid.

4. In a system as set forth in claim 1, wherein said sampler comprises a first impedance, having first and second terminals; means for applying said speech waves upon the first impedance; a storage condenser, having first and second terminals, and means therefor for connecting its first terminal to the first terminal of the first impedance; a first circuit comprising series-connected rectifier, second impedance and a bias potential; a second circuit comprising series-connected rectifier, third impedance and a bias potential; means for connecting the second terminal of the storage condenser to the second terminal of the first impedance through said first and second circuits independently, but oppositely polarized; means for deriving output pulse from said distributor, and means therefor for applying the pulse upon the second and third impedances in unlike polarities, so as to oppose said bias potentials and allow said condenser to charge or discharge the first and second circuits proportionally corresponding to the difference of signal-potential across the first impedance that had resolved between last said pulse and a previously applied pulse; and means for deriving output signals from said charges and discharges in the condenser.

5. In a system as set forth in claim 1, wherein said wave differentiator comprises a first impedance, having first and second terminals; means for applying said speech waves upon the first impedance; a storage condenser, having first and second terminals, and means therefor for connecting its first terminal to the first terminal of the first impedance; a first circuit comprising series-connected rectifier and second impedance; a second circuit comprising series-connected rectifier, third impedance and a bias potential; means for connecting the second terminal of the storage condenser to the second terminal of the first impedance through said first and second circuits independently, but oppositely polarized; and alternating voltage source and means therefor for applying same upon the second and third impedance simultaneously in like polarity and of such magnitude, as to cause signal charge across said condenser through the first circuit, while just preventing discharge through the second circuit by virtue of said bias, and thereby allowing charge or discharge of the condenser at near each lobe of the alternating voltage when the speech wave-voltage across the first impedance has changed in amplitude during succeeding said lobes, said charge or discharge depending upon the direction in which said speech wave changes; and means for deriving an output signal at each reversal in direction of said charge and discharge.

6. In a system of speech wave analysis of the character set forth in claim 1, a signal adder which comprises first and second electronic discharge devices having cathode, anode and control-elements; a first impedance in the anode circuit of the second device, and means therefor for connecting same upon the control-element of the first device; a second impedance in the cathode circuit of the first device to a common ground terminal; a storage condenser and a rectifier connected in series with the second impedance, so that the condenser may be charged to any potential that may appear across the second impedance; means for applying the ground-end potential of the condenser upon the control-element of the second device, so that the second device assumes a normal conductance with its control-element at ground potential, while the first device assumes a normal conductance with a potential on its control-element as determined by the anode potential of the second device, and in consequence, the condenser assumes a normal charge as determined by the normal conductance of the first device; means for applying a voltage signal upon the condenser, and simultaneously applying the same voltage signal in opposite polarity upon the control-element of the second device, so that during the charging period of said condenser the conductance of the second device remains unchanged, while during homeward return of said signal the second device changes its conductance, and thereby changing the conductance of the first device until both are stabilized to a new state proportional to the added signal; and means for discharging said condenser after the process of adding is ended for a new start aforesaid.

7. In speech wave analysis, a major-peak detector for signalling the arrival or ending of wave patterns, which comprises a source of speech waves; a series-connected first circuit comprising a first rectifier and a storage condenser; means for applying the output of said source upon said circuit, whereby to obtain unidirectional potential storage in said condenser, proportional to the peak values of the speech waves; a series-connected second circuit comprising a second rectifier and an impedance; means for connecting the second circuit in series with said condenser and the source of speech waves, in a manner, as to obtain a first signal across said impedance whenever the polarity of the speech wave is in opposite direction of said unidirectionally stored potential; a trigger circuit having first and second control input-circuits; means for applying the first signal upon the first control input-circuit of the trigger, whereby to trigger it into a first state of operation and produce at its output second signal; a normally inoperative grid-controlled discharger electronic device across said condenser; means for applying said second signal upon the discharge device so as to render it operative and discharge part of the stored potential quantity in the condenser; means for deriving a third signal from said condenser during its recovery action from last said discharged state by an incoming major peak of the speech waves; and means for applying the third signal upon the second control input-circuit of the trigger, whereby to alter its operation to a second state for repeated operation aforesaid.

8. As set forth in claim 7, wherein is included means for varying non-linearly the amplitude of the speech wave of said source of speech wave, whereby exaggerating the differences of said peak values of the speech wave, and thereby rendering said peaks more distinguishable for major peak detection.

MEGUER V. KALFAIAN.

No references cited.